United States Patent
Duncan et al.

(10) Patent No.: US 12,338,576 B1
(45) Date of Patent: Jun. 24, 2025

(54) METHOD AND KIT FOR TIE-DYEING

(71) Applicant: Paisley Crafts, LLC, Fresno, CA (US)

(72) Inventors: Chase Robert Hawk Duncan, Fresno, CA (US); Karen Mie Nishikawa, Clovis, CA (US)

(73) Assignee: Paisley Crafts, LLC, Fresno, CA (US)

( * ) Notice: Subject to any disclaimer, the term of this patent is extended or adjusted under 35 U.S.C. 154(b) by 826 days.

(21) Appl. No.: 17/581,899

(22) Filed: Jan. 22, 2022

Related U.S. Application Data

(63) Continuation-in-part of application No. 17/019,143, filed on Sep. 11, 2020, now abandoned.

(60) Provisional application No. 63/140,748, filed on Jan. 22, 2021, provisional application No. 62/902,321, filed on Sep. 18, 2019.

(51) Int. Cl.
| | |
|---|---|
| *D06P 5/20* | (2006.01) |
| *C09B 26/06* | (2006.01) |
| *C09B 67/00* | (2006.01) |
| *C09B 67/22* | (2006.01) |
| *D06P 5/00* | (2006.01) |

(52) U.S. Cl.
CPC ............ *D06P 5/2083* (2013.01); *C09B 26/06* (2013.01); *C09B 67/0034* (2013.01); *D06P 5/002* (2013.01)

(58) Field of Classification Search
CPC ........ D06P 5/002; D06P 5/2083; C09B 26/06; C09B 67/0034
See application file for complete search history.

(56) References Cited

U.S. PATENT DOCUMENTS

| | | | |
|---|---|---|---|
| 4,951,483 | A | 8/1990 | van Olphen |
| 6,174,336 | B1 | 1/2001 | Kondo |
| 2001/0054209 | A1 | 12/2001 | Collins et al. |
| 2010/0163553 | A1 | 7/2010 | Backaert et al. |
| 2013/0055509 | A1 | 3/2013 | Wijerama |
| 2016/0176614 | A1 | 6/2016 | Mittal et al. |
| 2017/0043913 | A1 | 2/2017 | Strachan |
| 2018/0187370 | A1 | 7/2018 | Clark |

FOREIGN PATENT DOCUMENTS

| | | | | |
|---|---|---|---|---|
| JP | 2009174097 A | * | 8/2009 | ............... A41D 1/00 |

OTHER PUBLICATIONS

2 Minute Tie Dye Kit Reviews, Aug. 24, 2020 https://www.covetbytricia.com/2020/08/24/2-minute-tie-dye-kit-reviews-microwave-dyeing-technique/.*
What is the effect of temperature on fiber reactive dyes?, Web page <http://www.pburch.net/dyeing/FAQ/temperature.shlml>, 2 pages, retrieved on Mar. 15, 2021.
Basic Tie-Dye Instructions Using Procion-MX Dyes on cotton T-shirts, Nov. 5, 2012. https://www.earthguild.com/products/riff/tiedye.htm.
Gayle, After the Salt, Soda Ash and Dye Are Mixed Does It Have a "Shelf Life"?, May 10, 2009 http://www.pburch.net/dyeing/dyeblog/C2070637368/E20090506185633/index.html.
Burch , What is the chemical structure of Procion MX dye? Jan. 9, 2000 http://www.pburch.net/dyeing/FAQ/structure.shtml.
Using a microwave to accelerate the dye reaction—Tru Tie-Dye http://www.truetiedye.com/microwave-tie-dye.html, Jan. 30, 2009.

* cited by examiner

*Primary Examiner* — Amina S Khan

(57) ABSTRACT

Methods and kits are provided for tie-dyeing various materials. A garment or other object is soaked using water or a different liquid, excess water is removed, the object is gathered and tied with one or more self-releasing bands, and at least one dye is applied to the object. The dyed object is then placed in a heat-resistant container and heated in a heat source such as a microwave. The self-releasing bands break during the application of heat, enabling easier and safer retrieval of the garment.

20 Claims, 2 Drawing Sheets

METHOD AND KIT FOR TIE-DYEING

CROSS-REFERENCE TO RELATED APPLICATIONS

The present application is a continuation-in-part of U.S. patent application Ser. No. 17/019,143, entitled "METHOD AND KIT FOR TIE-DYEING," filed Sep. 11, 2000, which claims the benefit of U.S. Provisional Patent Application No. 62/902,321, entitled "METHOD AND KIT FOR TIE-DYEING," filed Sep. 18, 2019, and claims the benefit of U.S. Provisional Patent Application No. 63/140,748, entitled "METHOD AND KIT FOR TIE-DYEING," filed Jan. 22, 2021, each of which is incorporated by reference herein in its entirety.

BACKGROUND

This specification relates generally to a method and kit for tie-dyeing objects. Tie-dyeing is a process of dyeing an object, usually a garment, by hand. One or more portions of the garment are gathered together and then the gathered portions are tied or otherwise held together. After the garment has been tied, dyes are applied, either by immersion of the garment into a dye bath or by applying dye directly to the garment. After the dye sets, the garment is untied, revealing the surprise of the dye pattern. Rubber bands are conventionally used to tie the garment together, but conventional rubber bands are difficult to remove from the garment due to their limited elasticity. It can also be difficult to remove conventional rubber bands without damaging the fabric or disturbing the dye pattern. In addition, if heat is applied (e.g., using a microwave) to the dyed garment to increase the setting speed, the rubber bands may be very hot when the garment is first removed from the microwave, increasing the risk of burns to the user. There remains a need for a tie-dye method and kit that decreases the difficulty of removing the bands from the dyed garment.

SUMMARY

In accordance with the foregoing objectives and others, exemplary methods are disclosed herein to create tie-dyed objects (e.g., garments) faster and more conveniently than conventional means. One embodiment relates to a method for tie-dyeing an object comprising: soaking the object; removing excess liquid from the object; gathering and tying at least one portion of the object using at least one self-releasing band; applying at least one dye to the object; placing the object in a container; placing the container in a heat source; and heating the container and object, wherein the at least one band breaks during the heating.

Implementations of this embodiment include: wherein the heat source is a microwave; wherein the container comprises polypropylene; wherein the container is configured to include a reservoir, the reservoir configured to hold a substance to help keep the object damp during the heating process; wherein the container is configured to elevate the object off the floor of the container; wherein the container is configured to receive a drop-in liner; wherein at least one of the at least one dye comprises a monochlorotriazine dye; wherein at least one of the at least one dye comprises a dichlorotriazine dye; wherein the at least one of the at least one dye further comprises sodium carbonate and/or sodium bicarbonate; and wherein the at least one self-releasing band comprises thermoplastic.

Another embodiment relates to a kit for tie-dyeing an object comprising: at least one dye; at least one self-releasing band; and a heat-safe container.

Implementations of this embodiment include: wherein the container is microwave-safe; wherein the container comprises polypropylene; wherein the container is configured to include a reservoir, the reservoir configured to hold a substance to help keep the object damp during the heating process; wherein the container is configured to elevate the object off the floor of the container; wherein the container is configured to receive a drop-in liner; wherein at least one of the at least one dye comprises a monochlorotriazine dye; wherein at least one of the at least one dye comprises a dichlorotriazine dye; wherein the at least one of the at least one dye further comprises sodium carbonate and/or sodium bicarbonate; and wherein the at least one self-releasing band comprises thermoplastic.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Various methods are disclosed herein for tie-dyeing objects. The disclosed methods enable the bands tying the dyed garment together to be removed more easily. While the below examples may specify the dying of a garment, the present invention is not limited as such and encompasses dying of other objects.

Figure 1:
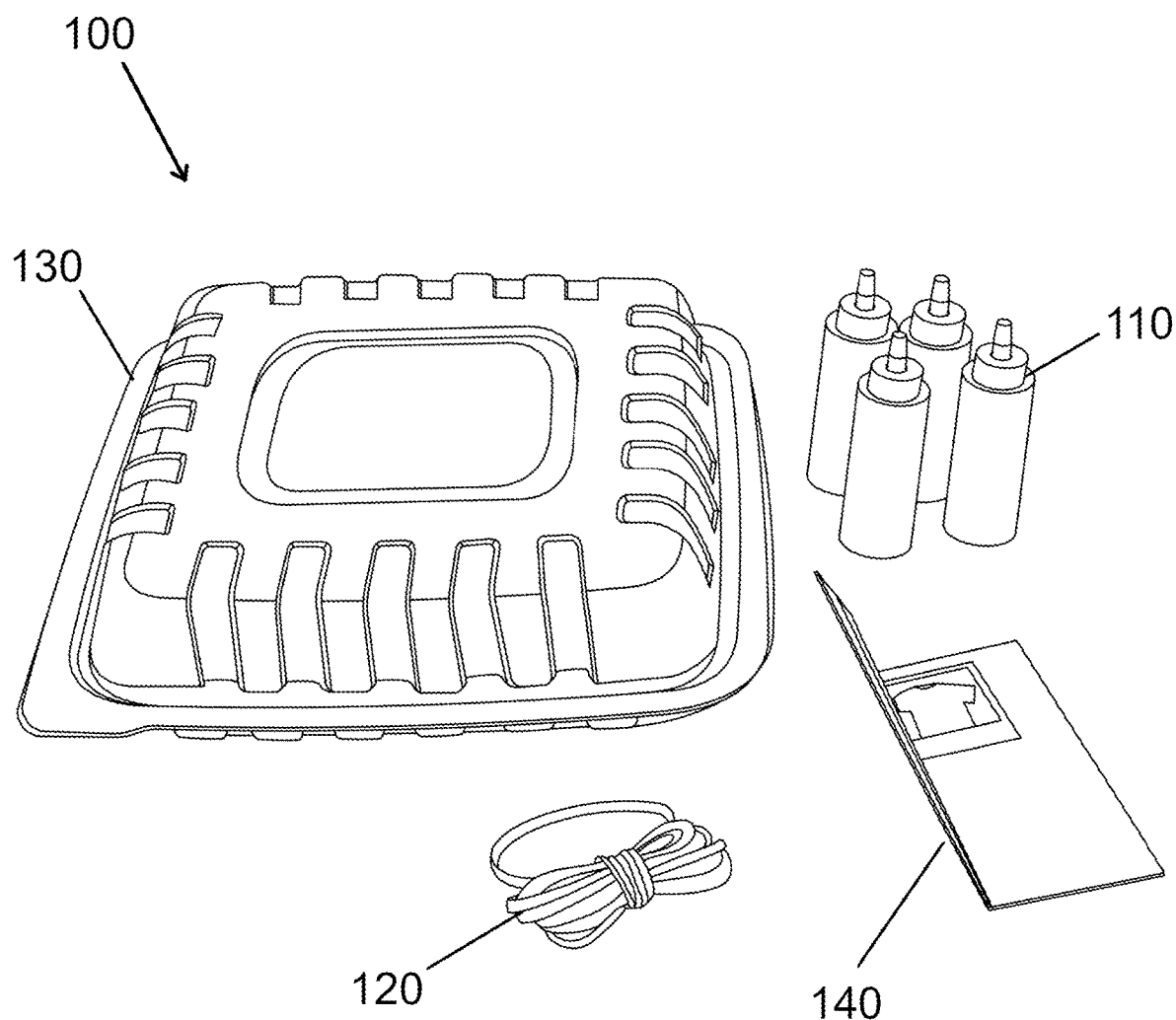
FIG. 1 shows an embodiment of a tie-dyeing kit according to the principles of the present disclosure.

Referring to FIG. 1, a tie-dying kit 100 includes one or more bottles (or other container) 110 of dye or dye powder, elastic bands 120, heat-resistant container 130, and an instruction sheet or manual 140.

The bottles 110 of dye preferably comprise multiple colors of dye, e.g., blue, red, green, yellow, etc. The dye formulation will generally vary by color, and may comprise one or more of the following: reactive dyes; fiber reactive dyes; hot-water fiber reactive dyes; heat-activated dyes; dichlorotriazine reactive dyes; monochlorotriazine reactive dyes; vinyl sulfone; bifunctional dyes comprising a combination of any of the above, e.g., a bifunctional dye with a vinyl sulfone group and a monochlorotriazine group. The dye formulation may also comprise one or more of: direct dyes, disperse dyes, acid dyes, FD&C and D&C dyes, sulfur dyes, azoic dyes, vat dyes, basic dyes, mordant dyes, natural dyes, solvent dyes, and pigments.

The dye formulation may also include one or more fixatives, such as alkalis, salts, and/or acids. Alkalis include baking soda, soda ash, borax, potassium carbonate, trisodium phosphate, tetrasodium pyrophosphate, urea, sodium sesquicarbonate, etc. Salts include sodium chloride, magnesium sulfate, sodium sulfate, etc. Acids include citric acid, etc. Alkalis raise pH, and are useful for cellulose-based fibers, such as cotton and rayon. Acids lower pH, and are useful for protein-based fibers such as wool. Salts do not change pH, but promote dye exhaustion (transferring the dye from the water solution to the fabric). For example, a dye may comprise a fiber reactive dye with baking soda, or a hot-water fiber reactive dye mixed with soda ash and salt.

In general, prior art dye ratios run from about 1 part dye to 1-100 parts alkalis, salts, and/or acids. Cold water tie dye ratios tend to run lower, generally about 1 part dye to 1-10 parts alkali (and sometimes salt). Hot water dyes tend to run higher, generally about 1 part dye to 10-100 parts alkali (and usually salt).

Conventional tie dyeing uses cold water dichlorotriazine dye and perhaps salt or other fixative in the bottle. Soda ash comes separately to minimize hydrolysis in the bottle, and is mixed with a good amount of water (approximately a gallon). The garment is soaked in the soda ash solution prior to the dye being applied.

Other dye formulas use dichlorotriazine dyes with soda ash in the dye bottle. The pH of soda ash is around 11.5, which is about 1000 times more alkaline than sodium bicarbonate at about 8.5. However, with soda ash formulas, the dyes begin to react (hydrolyze) quickly when water is added to the dye bottle. If the consumer delays adding dye to fabric for more than 30 minutes, dye strength on fabric will be poor.

Still other dye formulas contain dichlorotriazine dyes and sodium bicarbonate in the dye bottle. Using sodium bicarbonate instead of soda ash greatly reduces the speed of hydrolysis, enabling the consumer to take up to 24 hours to use up the dye in the bottle without significant dye strength loss on fabric. Results are reasonably good, but soda ash is a more effective fixative.

Hot water dyeing generally results in a more intensely colored garment. Prior art hot water dyeing uses monochlorotriazine dyes, soda ash, salt, and hot water. An example dye consists of a 50 gram packet containing 1-8 grams dye, and 42-49 grams soda ash. The dye packet is added to one gallon water containing 4 tablespoons salt heated to approximately 130-180 degrees F. The garment is added to the dyebath with stirring for 30 to 60 minutes. Although color intensity is good, the consumer can dye the fabric only one color. Partially dipping fabric into two or more different colored dyebaths can add color variety, but not achieve the design complexity of tie dyed garments.

Introducing a heat source, e.g., a microwave oven, creates the opportunity to use the more intensely colored monochlorotriazine dyes for tie dyeing garments with multiple colors. In addition, monochlorotriazine dyes appear to resist hydrolysis better than dichlorotriazine dyes, so soda ash can be used instead of sodium bicarbonate. Bottle dwell time is much improved compared to prior formulas including soda ash (at least 1 hour and possibly up to 24 hours), without poor results on fabric.

Dye formulations for use with the instant method may comprise dye (monochlorotriazine or dichlorotriazine), salt, sodium carbonate, sodium bicarbonate, and/or other items, in a ratio of 1-100 parts salt. 1-100 parts sodium carbonate, 1-100 parts sodium bicarbonate, and/or 1-100 parts other items, per every 10 parts dye. In a preferred embodiment, dye formulations for use with the instant method may comprise dye (monochlorotriazine or dichlorotriazine), salt, sodium carbonate, sodium bicarbonate, and/or other items, in a ratio of 3-30 parts salt, 3-30 parts sodium carbonate, 3-30 parts sodium bicarbonate, and/or 3-30 parts other items, per every 10 parts dye. Usually, either sodium carbonate or sodium bicarbonate will be present, but not both. The use of salt in the dye formulation is optional.

In an embodiment, the dye formulation may also include additive or other substances that can enhance or alter the tie-dye appearance. Such additives may include, e.g., oil (e.g., vegetable oil), bleach, thickeners, etc.

An example dye formulation for use with the instant method comprises monochlorotriazine (hot water) dye, soda ash (sodium carbonate), and salt at a ratio of 1-4 parts monochlorotriazine (hot water) dye to 2-3 parts soda ash (sodium carbonate) to 2-3 parts salt. Another example comprises dichlorotriazine dye, sodium bicarbonate, and salt at a ratio of 1-4 parts dichlorotriazine dye to 2-3 parts sodium bicarbonate to 2-3 parts salt.

In an embodiment, elastic bands 120 are made of thermoplastic. These types of bands have useful properties when used in connection with tie-dyeing a garment. For example, they have a higher elasticity (e.g., they are 'stretchier' and have a lower Elastic Modulus) than traditional rubber bands, which makes them easier to apply to and remove from a garment. Alternative types of bands with higher elasticity may also be used, e.g., ethylene propylene diene monomer (EPDM) bands, polyester bands, etc.

In addition, with respect to the embodiment where the dyed garment is microwaved, thermoplastic bands break when heated to the temperature reached during microwaving of the dyed garment. In testing, thermoplastic bands break at about 140-145° F. when heated in a microwave under tension. This "self-releasing" confers several advantages:

First, under conditions where the breaking is audible, the user is alerted that the minimum temperature achieved to set the dye has been achieved.

Second, having the bands self-release creates less risk of cutting the dyed fabric because scissors no longer need to be used to cut the rubber bands. This has the additional benefit of reducing the risk of the user cutting him or herself, which is especially important when children are involved, as they often are in tie-dyeing.

Third, self-releasing bands reduce the amount of dye splattered when cutting bands (dye splatter is common when cutting conventional rubber bands), reducing mess. The bands release while inside of the protective microwave container, so any splashing is contained within the container.

Fourth, rubber bands can be very hot after microwaving, creating the potential for minor burns or discomfort when handing a microwaved garment. Self-releasing bands do not burn the user because the bands do not need to be handled after they have snapped off of the fabric.

In addition to thermoplastic, other types of bands that break or release at temperatures reached by a microwave after about 2-4 minutes of heating (e.g., about 140-145° F.), may be used, e.g., un-vulcanized rubber, etc.

Container 130 may comprise a heat-safe container. In an embodiment, container 130 includes fitted lid 136, which helps to maintain the heat within the container during the heating and setting process. In an embodiment, container 130 may include vents (not shown), to help prevent the lid from popping off because of steam building up inside the container.

In one embodiment, the dyed object is placed inside the container 130 and placed in or on a heat source, e.g., microwave, conventional oven, stovetop, hot plate, etc., for a period of time to expedite the dye setting process. If the heat source is a microwave, the container 130 may comprise microwave-safe plastic, ceramic, or another material that will prevent the dye from spilling out of the container and contaminating the microwave. For conventional heat sources, other types of heat-resistant containers may be used, e.g., metal or ceramic pots and pans, glass bakeware (e.g., Pyrex), rice cookers, etc.

In one embodiment, the container may also be effective to contain fires. While users are instructed (via instruction sheet or manual 140) not to put dry garments into the microwave or other heat source, if a dry garment is placed in the microwave, or if it dries out during the microwaving process, the dry garment may scorch or catch fire. As such, in this embodiment, the container must not only be microwave-safe, it must also be configured to contain any fire that may occur. Preferred embodiments of the container that can contain accidental fires include, but are not limited to, plastic (e.g., polypropylene, polyethylene terephthalate (PET), high density polyethylene (HDPE), polyvinyl chloride (PVC), low density polyethylene (LDPE), polystyrene (PS), acrylic, nylon, polycarbonate, polylactic acid, biodegradable plastics, recycled plastics, etc.) containers; silicone containers; silicone bags; woven fiberglass bags; carbon fiber containers; vermiculite containers; silica paste (e.g., as a layer in a container such as a fiberglass fabric bag, polypropylene container, etc.); etc. Additional microwavable, non-metal, fire resistant materials may also be used, such as tempered glass, microwave-safe ceramics, concrete, aramid fibers, carbon foam, steamer bags, autoclave bags, oven bags, turkey slow cooker bags, paper, cardboard, etc.

In one embodiment, the container may include a reservoir (e.g., at the top or bottom of the container) for water, ice, etc., to produce steam to help keep the garment damp during the heating process. An upper water reservoir may also provide a self-extinguishing capability to the container, which is activated (allowing the water to flow over the garment) in the presence of extreme heat or smoke.

Figure 2:
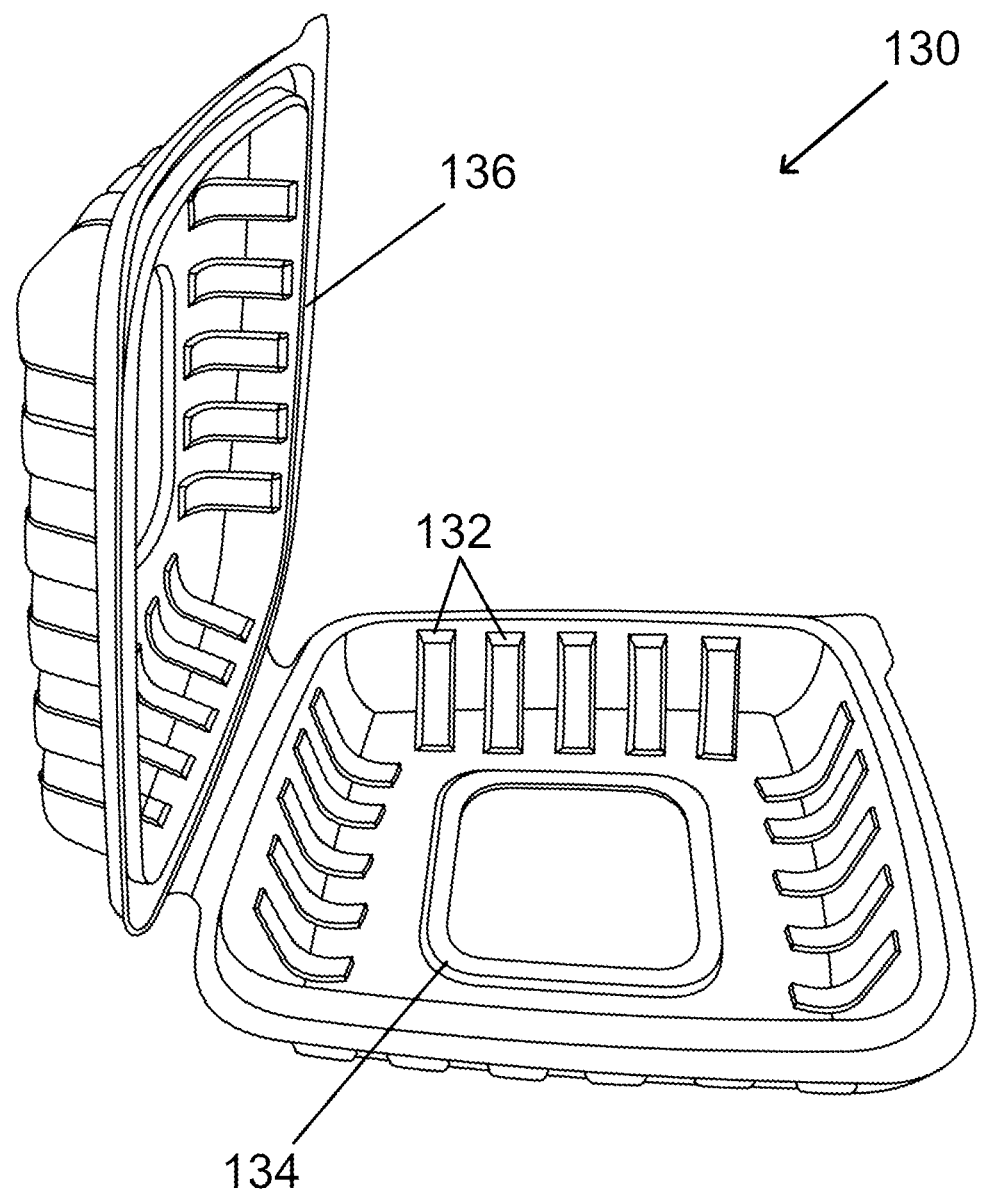
FIG. 2 shows an embodiment of a heat-resistant container according to the principles of the present disclosure.

The container 130 may be further configured to elevate the garment off the floor of the container, e.g., via a series of ridges 132 that form grooves and/or gutters that contain any dye that drips off of the garment, as shown in FIG. 2. The container 130 may also include one or more center ridges 134 for the same purpose. This helps to prevent the dyes from bleeding into areas of the garment where it not wanted. In an alternative embodiment, the container may instead be configured to receive a drop-in liner, with the liner comprising ridges that elevate the garment above the bottom surface of the container.

The drop-in liner may comprise plastic or another suitable material as described herein, e.g., polypropylene, silicone, fiberglass, etc. The drop-in liner may comprise the same material as container 130 or a different material.

Instruction sheet or manual 140 may comprise one or more instructions for a user to perform a method for tie-dying an object, e.g., a garment. The instruction sheet may further comprise one or more techniques or tie patterns showing the user how to tie and dye a garment to obtain a particular pattern.

In use, the tie-dyer takes the object, in an example case a garment, and pre-soaks the garment in water or a solution of water and soda ash (if necessary for adjustment of the pH) long enough for the fibers of the garment to have become saturated with water. For cotton garments, the pre-soaking time is 2 minutes or greater.

After soaking, the tie-dyer then removes excess water from the garment, e.g., by squeezing or wringing out the garment until the garment is damp. The garment must remain damp to prevent the garment from burning or smoldering.

The tie-dyer then gathers or folds one or more desired sections of the garment together, and binds the gathered sections using the self-releasing bands 120.

The tie-dyer performs any necessary preparation of the dyes (e.g., adding water to a dye powder or tablet) then applies one or more colors of dye to the garment as desired. In addition, salt granules in sufficient quantity can enhance and alter the dye pattern (by deepening color and/or creating crisp patterns) when applied directly to a folded garment.

After the garment has been dyed, the user places the tied garment in container 130, and seals the container shut. The container is then placed in a heat source and heat is applied for a period of time sufficient to set the dye. In general, the water in the garment needs to be heated to above 120° F., preferably 140-160° F., to provide enough energy for the dye to hydrolyze and form a covalent bond with the fabric. This temperature is also sufficient to break the thermoplastic bands.

In the embodiment where the heat source is a microwave, the garment should be heated for between 2 and 4 minutes, depending on the power (wattage) of the microwave and the amount of material in the garment. For example, a youth size t-shirt will be microwaved in a 700 watt oven for about 3 minutes and in a 1000 or more watt oven for about 2 minutes. An adult size t-shirt will be microwaved in a 700 watt oven for about 3.5 minutes and in a 1000 or more watt oven for about 2.5 minutes. As long as the t-shirt is fully wet or damp when put into the microwave, it should be able withstand about 5 minutes of heating before parts of the t-shirt may start to scorch or catch fire, so heating times of up to about 5 minutes may be used if the type of dye requires it.

After the microwave has finished heating the garment, the container with the tie-dyed garment can be removed from the microwave and left to cool for a period of time sufficient to cool the garment enough to be safely handled, e.g., about 15-25 minutes. This extra time also allows the dye to further set into the fabric of the garment. Because of the use of self-releasing bands, the garment may be removed from the container and immediately rinsed to remove any excess dye, washed and dried (e.g., in a standard washing machine and/or dryer), without having to individually remove the rubber bands, with its inherent difficulty and dangers.

In an embodiment, the dye may be allowed to set without using an additional heat source, e.g., a microwave. This is closer to the traditional tie-dyeing method. However, thermoplastic bands are stretchier traditional rubber bands, therefore the use of thermoplastic bands instead of other types of elastic bands increases the ease of tying the garment and removing the bands after the dye is set.

In an embodiment, a different or additional mechanism can be used to provide the user with an audible indicator that the garment (or other object) has reached a sufficient temperature to set the dye. For example, a microwave-safe whistle insert may be placed in a vent hole of the container. This insert would make a whistling sound (via steam build up) when the temperature inside the container reaches the desired level, e.g., about 140-145° F. Alternatively, the container may comprise a portion that is shaped to provide a whistling sound at the appropriate temperature.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method for tie-dyeing an object comprising:
    soaking the object;
    removing excess liquid from the object;
    gathering and tying at least one portion of the object using at least one self-releasing band;
    applying at least one dye to the object;
    placing the object in a container;
    placing the container in a heat source; and
    heating the container and object,
    wherein the at least one band breaks during the heating.

2. The method of claim 1, wherein the heat source is a microwave.

3. The method of claim 1, wherein the container comprises polypropylene.

4. The method of claim 1, wherein the container is configured to include a reservoir, the reservoir configured to hold a substance to help keep the object damp during the heating process.

5. The method of claim 1, wherein the container is configured to elevate the object off the floor of the container.

6. The method of claim 1, wherein the container is configured to receive a drop-in liner.

7. The method of claim 1, wherein at least one of the at least one dye comprises a monochlorotriazine dye.

8. The method of claim 1, wherein at least one of the at least one dye comprises a dichlorotriazine dye.

9. The method of claim 7, wherein the at least one of the at least one dye further comprises sodium carbonate and/or sodium bicarbonate.

10. The method of claim 1, wherein the at least one self-releasing band comprises thermoplastic.

11. A method for tie-dyeing fabric, the method comprising:
    binding portions of the fabric together using a self-releasing band such that the self-releasing band is under tension;
    applying a dye to the fabric; and
    heating the fabric and the self-releasing band to a temperature sufficient to cause the self-releasing band to break and release the fabric.

12. The method of claim 11, further comprising:
    heating the self-releasing band at a temperature of about 140 degrees Fahrenheit to about 145 degrees Fahrenheit to break the band and release the fabric.

13. The method of claim 11, further comprising:
    heating the fabric and the self-releasing band in a microwave.

14. The method of claim 13, further comprising:
    heating the fabric and the self-releasing band in a microwave at 700 watts or 1000 watts for about 2 minutes to about 5 minutes to break the band and release the fabric.

15. The method of claim 11, wherein the self-releasing band comprises thermoplastic.

16. The method of claim 15, wherein the self-releasing band comprises ethylene propylene diene monomer (EPDM), polyester, or un-vulcanized rubber.

17. The method of claim 11, further comprising:
    prior to heating the fabric and the self-releasing band, placing the fabric and the self-releasing band in a container,
    wherein, during the heating when the self-releasing band breaks, splatter from the dye is contained within the container.

18. The method of claim 17, wherein the container comprises polypropylene.

19. The method of claim 11, further comprising:
    prior to heating the fabric and the self-releasing band, applying water to the fabric.

20. The method of claim 11, wherein the dye comprises monochlorotriazine.

* * * * *